Feb. 28, 1939. M. J.-B. BARBAROU 2,148,795
FLEXIBLE COUPLING
Filed June 21, 1937 2 Sheets-Sheet 2
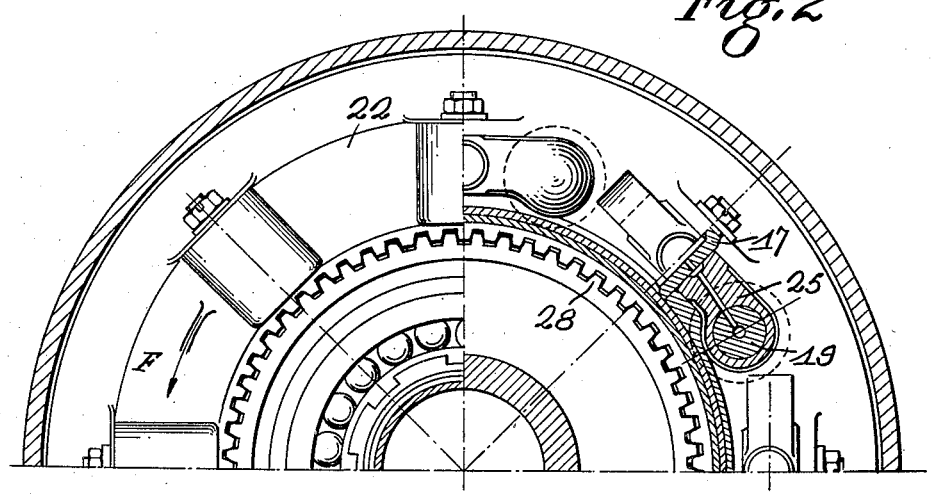
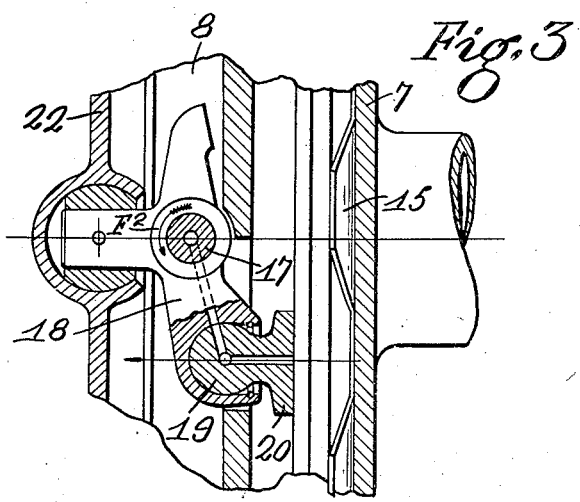
Inventor
Marius J.B. Barbarou
By Raymond A. ...
Attorney Patented Feb. 28, 1939

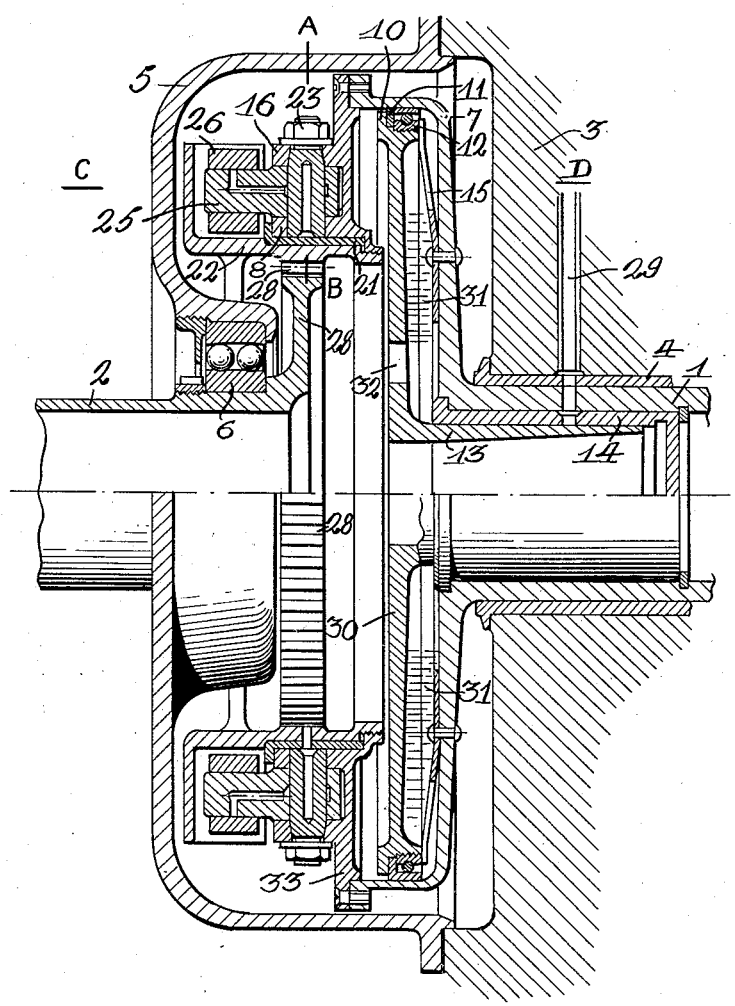

2,148,795

UNITED STATES PATENT OFFICE 2,148,795

FLEXIBLE COUPLING

Marius Jean-Baptiste Barbarou,
Neuilly-sur-Seine, France

Application June 21, 1937, Serial No. 149,429
In France June 26, 1936

9 Claims. (Cl. 64—6)

The present invention has for its object a flexible coupling to transmit the power from a driving shaft which may be subjected to instantaneous variations of speed to a driven shaft which can thus be protected from the said variations of speed so avoiding the formation of vibrations of running.

The same arrangement being naturally reversible, also deadens any transmission of oscillations from the driven member to the driving shaft.

According to a principal characteristic a flexible coupling according to the invention utilises the pressure exerted by a ring of oil formed by the rotation of the driving shaft to counteract the resistant couple, and this in such manner that any instantaneous variation of speed is practically without influence on the ring of oil and the pressure remains approximately constant in the course of the variation.

In a preferred embodiment of an apparatus according to the principle mentioned there may be advantageously utilised a piston adapted to move along the axis of the coupled members, the said piston taking on one of its faces the pressure exerted by the ring of oil in rotation, and being subjected on the other face to the resistant couple transmitted by levers adapted to oscillate about a mean position.

There is thus produced between the driving and the driven shafts an angular displacement which is limited and dampened by the displacement of the piston bearing upon the driven ring of oil.

With the foregoing and other objects in view, the invention resides in the combination of parts and in the details of construction hereinafter set forth in the following specification and appended claims, certain embodiments being illustrated in the accompanying drawings, in which:

Fig. 1 is a longitudinal section of the coupling according to a preferred embodiment, Fig. 2 is a cross-section on the line AB of Fig. 1, Fig. 3 is a cross section on the line CD of Fig. 1.

Let 1 be the driving shaft and 2 the driven shaft. The shaft 1 is mounted in a support 3 through the intermediary of a bearing 4. The shaft 2 is mounted in the cover 5 on a roller bearing 6. The two shafts, driving and driven, are arranged coaxially.

The extremity of the shaft 1 comprises a cylindrical sleeve 7 inside which a piston 10 is movable longitudinally, the sliding surfaces of which are provided with a leather 11 clamped in position by a nut 12.

Through a web 24 there is secured to the sleeve 7 a circular ring 8 serving for centering an intermediate ring 22 on a bearing 21.

The piston 10 is centered in the shaft 1 by its hub 13 and the bearing 14. A spring 15, for example, an elastic washer comprising a number of branches arranged in star form, tends to displace the piston continuously towards the left hand side of the drawings.

On the ring 8 is provided a certain number of lugs 16, for example, eight. The ring and the lugs are bored to take hinge pivots 17 arranged radially in a plane perpendicular to the longitudinal axis of the shafts. These pivots are held by nuts 23. On these are mounted levers 18. Each lever 18 can oscillate perpendicularly to the pivots 17. One of the extremities serves to take a ball 19 provided on a shoe 20 which bears on the bottom of the piston 10; the other extremity comprises a flat surface 29 which on a sufficient angular displacement, can come into contact with the web 24 connecting the ring 8 to the sleeve 7. Each lever 18 finally comprises a projection 25 centered in a friction bushing 26 of cylindrical shape which is fitted in a socket 27 on the ring 22. The latter thus comprises eight sockets corresponding to the number of levers; it is geared by the teeth 28 to the driven shaft 2.

The oil used comes through the pipe 29 and passes into the chamber 30 limited by the piston 10 and the sleeve 7. When at rest it takes up a certain level.

When rotated it forms the ring indicated on Fig. 1 by broken lines 31 and the height of the ring is determined by the hole 32. All the surplus oil will leave by this orifice and return through openings 33 to the casing 5 from which it is aspirated.

The operation of this device is as follows:

Suppose a rate of running carried out in the direction of the arrow F corresponding to a certain speed of the driving shaft 1, at this moment the ring 31 of oil exerts a certain pressure $F_1$ on the piston 10, as also the spring 15. As the shoes 20 are pressed against the face of the piston, the shaft 2 is driven at the same speed as the shaft 1. The levers are in equilibrium about their axes which rotate driven by the driving shaft. There is at this moment equilibrium between the motor couple and the resistance couple. Assuming an instantaneous variation of speed of the driving shaft, this speed increase does not immediately affect the driven shaft which tends to lag due to its inertia. The levers consequently oscillate at the same speed as the driving shaft on their axes 17 in the direction of the arrow $F_2$.

There is a slight sliding of the ring 22 on the bearing 21 and the levers move the piston 10.

If the speed of the driving shaft comes back to its original value the reverse movement takes place so that during the variation the driven shaft has remained at a constant speed.

If on the contrary the speed of the driving shaft remains at its fresh higher value than was originally the case, the pressure on the piston increases and the levers oscillate until attaining a fresh position of equilibrium corresponding to the fresh rate of running.

In the case of a rapid variation of the speed either in starting or in stopping when the resistance couple, owing to its inertia tends to drive the driving shaft, the levers either in one direction or in the other direction drive positively then coming into contact with their stop corresponding to the maximum oscillation.

It will be undesrtood that all constructional modifications made in the device described and shown are comprised within the scope of the present invention.

1. In a flexible device for coupling two shafts, driving and driven, a piston moving parallel to the axis of the said driving and driven shafts, fluid means for exerting a pressure by centrifugal force behind said piston during the rotation of the said driving shaft, and means comprising friction shoes being mounted at the extremity of pivoting levers driven by the said driving shaft and remaining whatever may be the angular variation of the levers, in contact with the surface of the said piston.

2. In a flexible device for coupling two shafts, driving and driven, a piston moving parallel to the axis of the said driving and driven shafts, fluid means for exerting a pressure by centrifugal force behind said piston during the rotation of the said driving shaft, means comprising friction shoes mounted at the extremity of pivoting levers driven by the said driving shaft and remaining whatever may be the angular variation of the levers, in contact with the surface of the said piston, the said oscillating levers being hinged on axes integral with the rim of a ring driven by the driving shaft, the angular variation of the said levers being controlled by studs integral with a multiple swivel box.

3. In a flexible device for coupling two shafts, driving and driven, a piston moving parallel to the axis of the said driving and driven shafts, under the action of the pressure exerted by the said fluid during the rotation of the said driving shaft, means for counteracting the resistance couple comprising friction shoes mounted at the extremity of pivoting levers driven by the said driving shaft and remaining whatever may be the angular variation of the levers, in contact with the surface of the said piston, one extremity of the levers serving as stop to limit the angular variation of the displacement in the case of a sudden variation of speed of one of the two shafts.

4. In a flexible coupling for coupling two shafts, driving and driven, a piston moving parallel to the axis of the said driving and driven shafts, under the action of the pressure exerted by the said fluid during the rotation of the said driving shaft, a spring bearing on the said driving shaft tending to displace the piston in order to maintain contact with the said friction shoes and ensure sufficient friction at starting, before the formation of the ring of fluid.

5. In a flexible device for coupling two shafts, driving and driven, a piston moving parallel to the axis of the said driving and driven shafts, under the action of centrifugal pressure exerted by fluid means during the rotation of the said driving shaft, and means comprising friction shoes mounted at the extremity of pivoting levers driven by the said driving shaft and remaining whatever may be the angular variation of the levers, in contact with the surface of the said piston, one extremity of the levers serving as stop to limit the angular variation of the displacement in the case of a sudden variation of speed of one of the two shafts.

6. In a flexible coupling for coupling two shafts, driving and driven, a piston moving parallel to the axis of the said driving and driven shafts, under the action of centrifugal pressure exerted by the fluid means during the rotation of the said driving shaft, friction shoes adapted to bear on the piston, and a spring bearing on the said driving shaft tending to displace the piston in order to maintain contact with the said friction shoes to ensure sufficient friction for starting, before the formation of fluid pressure.

7. In a flexible coupling between driving and driven shafts, a gear on the driven shaft, a ring secured to the driving shaft, an intermediate member interposed between the ring and the gear and meshing with said last, a plurality of levers pivoted on the intermediate member, said levers having one end secured to the ring, a piston movable axially within the ring and acted upon by fluid pressure centrifugally built up by rotation of the driving shaft, and shoes provided on the other end of the levers for bearing on said piston.

8. In a flexible coupling having driving and driven shafts, a revoluble carrier ring geared to the driven shaft, a drum on the driving shaft having a plurality of levers fulcrumed thereon, a piston slidable longitudinally within the drum, shoes on one end of the levers bearing on the outer face of the piston, the other end of said levers being slidably secured in sockets provided on the revoluble ring, and means for admitting behind the piston a fluid under centrifugal pressure created by the rotary movement of the driving shaft.

9. In flexible means for coupling a driving and a driven shaft, a drum on the driving shaft, a piston slidable longitudinally therein, a disc on the outer end of the drum, levers pivoted on said disc, shoes on one end of said levers and bearing on the outer face of the piston, a revoluble ring journalled concentrically within the levers disc and geared to the driven shaft, and ball and socket means on said ring for slidably securing the other end of the levers, whereby a fluid pressure centrifugally created behind the piston urges said last against the levers shoes to counteract oscillation thereof caused by the torque imparted on the ring.

MARIUS JEAN-BAPTISTE BARBAROU.